US008495624B2

(12) United States Patent
Banerjee et al.

(10) Patent No.: US 8,495,624 B2
(45) Date of Patent: Jul. 23, 2013

(54) PROVISIONING A SUITABLE OPERATING SYSTEM ENVIRONMENT

(75) Inventors: Pradipta Kumar Banerjee, Karnataka (IN); Vikas Bhardwaj, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 12/256,940

(22) Filed: Oct. 23, 2008

(65) Prior Publication Data

US 2010/0107155 A1  Apr. 29, 2010

(51) Int. Cl.
*G06F 9/445* (2006.01)

(52) U.S. Cl.
USPC .......................................... 717/177; 717/172

(58) Field of Classification Search
USPC ................................. 717/168–178
See application file for complete search history.

(56) References Cited

U.S. PATENT DOCUMENTS 7,281,247 B2 * 10/2007 Lodwick et al. .............. 717/176
2009/0276771 A1 * 11/2009 Nickolov et al. ............. 717/177

* cited by examiner

*Primary Examiner* — Chuck Kendall
(74) *Attorney, Agent, or Firm* — Yudell Isidore Ng Russell PLLC

(57) ABSTRACT

A method for provisioning a suitable operating system environment to a client machine in a client-server architecture including the at least one client machine in communication with a plurality of servers over a network. A pre-execution boot program is executed on powering the client machine, the pre-execution boot program being configured to identify a Dynamic Host Control Protocol (DHCP) server to obtain an Internet Protocol (IP) address for the client machine. Next, the client machine establishes contact with an installation server, which is coupled to the client machine over a network. Thereafter, the client machine receives a first software module from the installation server based on processor type of the client machine. The first software module scans the client machine using to obtain a list of hardware elements on the client machine and the client machine transmits the list of hardware elements on the client machine to the installation server. Finally, the client machine receives from the installation server a suitable Operating System Environment (OSE), including an operating system and device drivers for hardware elements previously identified on the client machine.

20 Claims, 5 Drawing Sheets

PROVISIONING A SUITABLE OPERATING SYSTEM ENVIRONMENT

TECHNICAL FIELD

This disclosure relates to client-server communications, and more specifically, to providing a suitable Operating System Environment (OSE) to client machines.

BACKGROUND OF THE INVENTION

Client-server networks have become a normal mode of operation for computers linked by local area networks communicating via Ethernet or similar closely-tied protocols, as well as more dispersed systems communicating over the Internet or proprietary wide-area groupings. A single organization may be faced with a task of administering a dispersed group of networks, communicating within some groups on local systems, linked with other groups and individual machines via loosely-linked systems such as the Internet. Putting to one side the dilemmas associated with security, data integrity and the like facing such systems, administrators face challenges in maintaining the commonality and uniformity of such systems. The seemingly simple issue of ensuring that mission-critical software systems are upgraded to the latest release levels can pose significant challenges.

On such systems, a first step in system administration is providing client machines in an operating system environment (OSE). One method for accomplishing that task is by deploying the OSE to the client machine itself, depending on processor type and add-on hardware installed on the client machine. Where the client machine is a thin client, deployed as part of a desktop virtualization solution, the OSE is provided by establishing a connection to a Virtual Machine (VM) hosting the OSE. The VM is typically installed on a server, a server in a client-server environment performs most or all of the application processing with little or none performed in the client, employing virtualization technologies like VMware, Xen, KVM etc, and is typically a counterpart to a thin client. The thin client provides the user with hardware such as a display, a keyboard and a mouse interface, driven by the specific OSE supplied by the server. The thin client may be a normal personal computer, specialized hardware, a hand-held device, or any device which is used in the manner described above.

In homogenous information technology (IT) environments (that is, IT environments where a large number of client machines have similar Central Processing Unit (CPU) architecture and add-on hardware), deployment of OSE can be completely automated by use of commonly known installation procedures such as Pre-boot Execution Environment (PXE), Bootstrap Protocol (BOOTP), Dynamic Host Configuration Protocol (DHCP), cloning, etc. In heterogeneous environments, however, the amount of automation that can be achieved is limited. Deployment of OSE in such heterogeneous IT environments requires significantly longer time, and may also be more prone to errors. Further, in a desktop virtualization environment, the client machine is a thin client, the user is generally not provided with any flexibility of choosing an OSE. The thin client connects to a particular OSE (hosted by a VM), which is either known to the user in advance or decided dynamically by a connection broker. The connection broker makes such decisions, based on factors such as the user's group or department, system load balancing and company policy. There are many scenarios where a thin-client user might need flexibility in choosing an OSE. For example, on a particular day and time, a thin-client user may want to do some software development work, and hence may need an OSE supporting relevant development tools. Likewise, on a different day and time, the thin-client user might want to browse the Internet, and hence may need an OSE that supports Internet browsing. Further, the thin-client might be equipped with special hardware like joystick, touch pad etc. and the user might be interested in testing a gaming software and hence may need an OSE that supports the add-on hardware. In some scenarios, all tools are packed into a single OSE to make it generic and applicable to all types of thin-client hardware. This solution leads to unnecessarily bloating the OSE, thereby increasing resource usage on the server hosting the OSE, and eventually becoming a performance hot-spot for efficient running of the thin-client environment.

SUMMARY

Embodiments of this invention are directed to provisioning a suitable operating system to a client machine in a client-server computer architecture.

In a first embodiment, a pre-execution boot program is executed on powering a client machine. The pre-execution boot program is configured to identify a Dynamic Host Control Protocol (DHCP) server to obtain an Internet Protocol (IP) address for the client machine. In one embodiment, the DHCP server also provides the address of the installation server. The client machine establishes contact with an installation server after obtaining a IP address. The installation server is coupled to the client machine over a network. Thereafter, client machine receives a first software module from the installation server based on processor type of the client machine. The first software module scans the client machine to obtain a list of hardware elements on the client machine. Thereafter, the client machine transmits the list of hardware elements on the client machine to the installation server. Finally, the client machine receives a suitable Operating System Environment (OSE) from the installation server, based on the processor type and the list of hardware elements transmitted to the installation server. The suitable OSE includes an operating system and device drivers for hardware elements corresponding to the list of hardware elements on the client machine.

In a further embodiment, a DHCP server provides an IP address to the client machine along with the address of the installation server, based on which contact is established between the client machine and an installation server coupled to the client machine over a network. Next, the installation server deploys a first software module on the client machine. The installation server may obtain information regarding the processor type of the client machine by requesting Vital Product Data (VPD) from the client machine. The first software module is configured to scan the client machine to generate a list of hardware elements on the client machine. The installation server receives the list of hardware elements on the client machine. Thereafter, the installation server packages an operating system and device drivers based on the list of hardware elements received from the client machine, to create a suitable OSE. Finally, the installation server provides one of the suitable OSE, a Virtual Machine (VM) image containing the suitable OSE, and a request to connect with a VM that hosts the suitable OSE and is deployed on the installation server, to the client machine.

In a further embodiment, a pre-execution boot program is executed on a client machine, on powering of the client machine. The pre-execution boot program identifies a DHCP server and obtains an IP address for the client machine. The client also receives the address of the installation server from the DHCP server. Next, the client machine establishes contact with an installation server coupled to the client machine over a network. The installation server receives VPD from the client machine and obtains processor type of the client machine based on the VPD. Thereafter, the installation server deploys a first software module on the client machine. The first software module is compatible with the processor type of the client machine. The first software module scans the client machine to generate a list of hardware elements on the client machine and sends it to the installation server. Thereafter, the installation server packages an operating system and device drivers based on the processor type and the list of hardware elements, to create a suitable OSE. Finally, the installation server provides the suitable OSE to the client machine by performing one of establishing a connection between the client machine and a VM deployed on the installation server, the VM hosting the suitable OSE, and deploying one of the suitable OSE and a VM image including the suitable OSE, on the client machine. The VM image is configured to run on the first software module.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
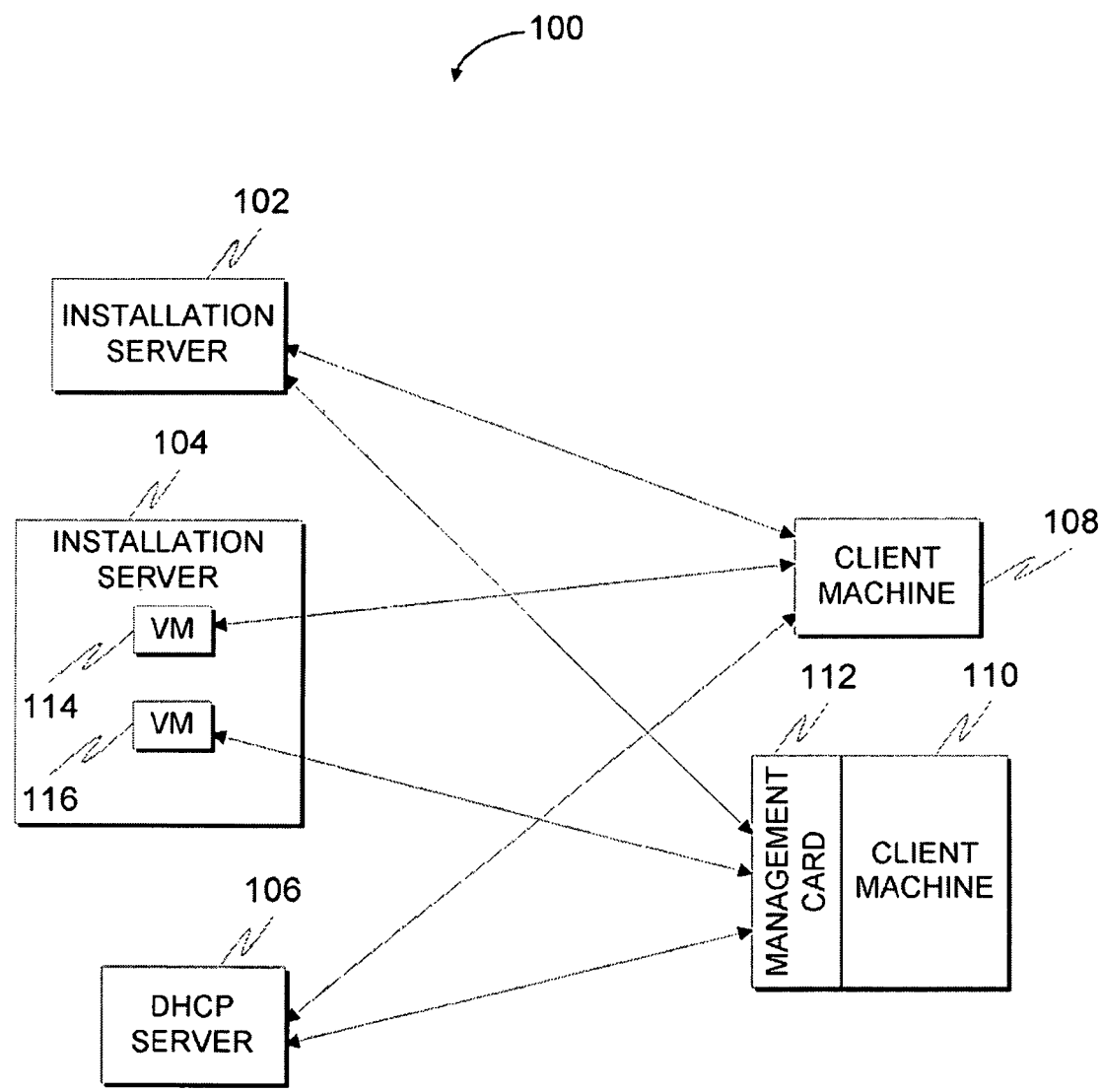
FIG. 1 is a block diagram illustrating an embodiment of an environment in which the invention may operate.

With reference now to FIG. 1, a block diagram illustrates an embodiment of an environment in which the invention may operate. The environment is a client-server computer architecture 100, including a network having two installation servers 102 and 104, and a Dynamic Host Configuration Protocol (DHCP) server 106, communicating with a number of client machines, here shown as client machines 108 and 110. In one embodiment, one or more of the installation server 102, the installation server 104 and the DHCP server 106 may be hosted on a single computing machine. In one embodiment, the installation server 102 and the installation server 104 may be located remotely from the client machines 108 and 110. It will be appreciated by those of ordinary skill in the art, that any number of installation and DHCP servers, and client machines may be employed in various embodiments of the invention.

The installation servers 102 and 104 are coupled to the client machines 108 and 110 over a network. The client machine 110 includes a management card 112. The management card 112 may be used by a system administrator to monitor and manage the client machine 110 remotely. An example of the management card 112 is an Intelligent Platform Management Interface (IPMI) card.

Virtual Machines (VMs) 114 and 116 are deployed on the installation server 104. The installation server 104 employs suitable virtualization technologies, for example, XEN, VMware, Kernel based Virtual Machine (KVM), which enables it to host VMs. It will be appreciated by those of ordinary skill in the art, that any number of VMs may be deployed on the installation server 104. The VM 114 is connected to the client machine 108 and the VM 116 is connected to the client machine 110.

Figure 2:
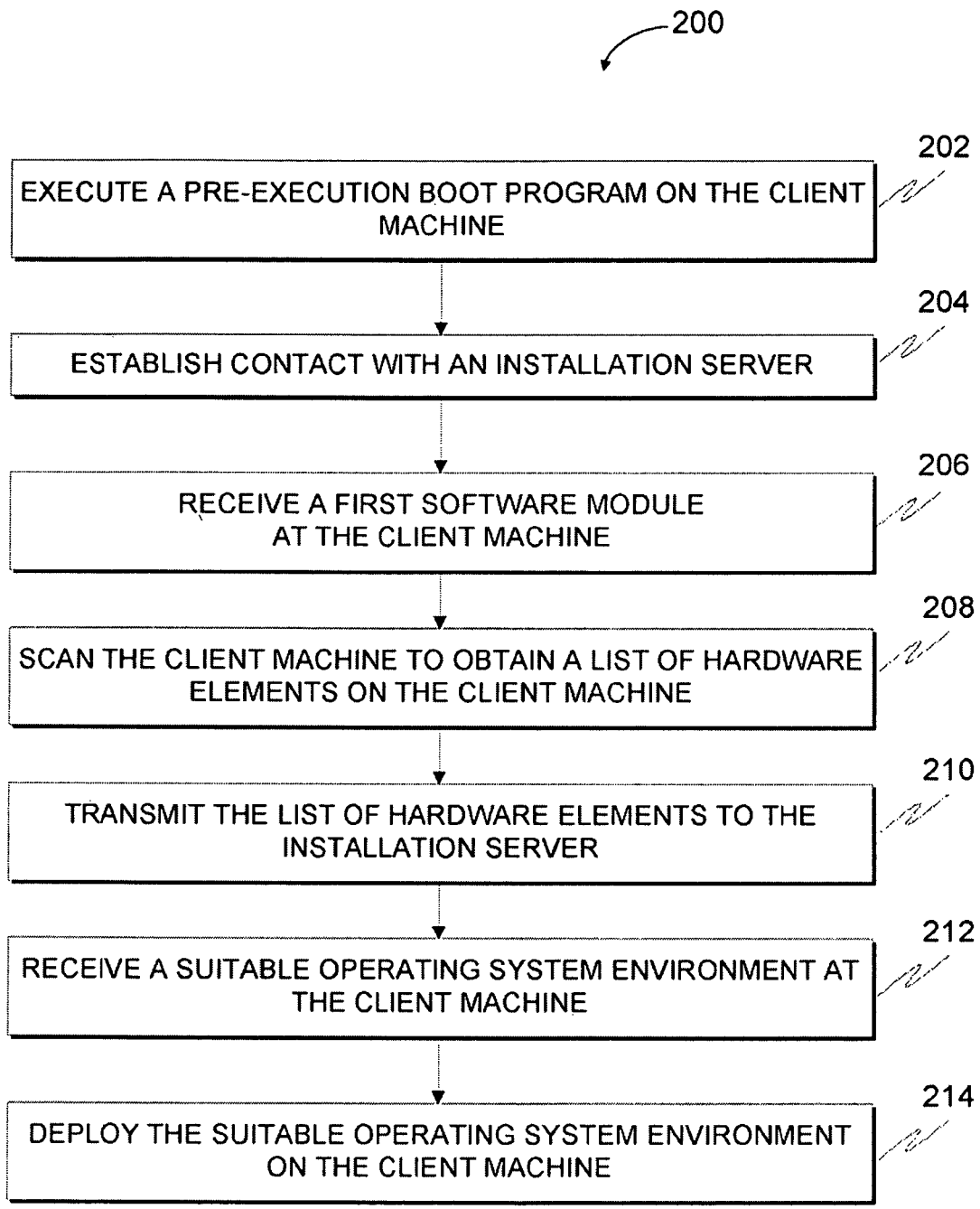
FIG. 2 is a flowchart of a method for provisioning a suitable operating system environment to a client machine in a client-server computer architecture in an embodiment of the invention.

FIG. 2 sets out a method 200 for provisioning a suitable operating system environment to the client machine 108 in the client-server computer architecture 100. The method 200 describes actions performed at the client machine 108 during operation of an embodiment. At step 202, on powering the client machine 108, a pre-execution boot program is executed at the client machine 108. The pre-execution boot program is configured to identify the DHCP server 106 and obtains an Internet Protocol (IP) address for the client machine 108. In one embodiment, the pre-execution boot program may send a DHCP request to the DHCP server 106 to obtain the IP address. Further, the pre-execution boot program may send a request to the DHCP server 106 for obtaining the IP addresses of at least one of the installation server 102 and the installation server 104. Then, at step 204, the client machine 108 establishes contact with at least one of the installation server 102 and the installation server 104. Here, at least one of the installation server 102 and the installation server 104 may also include the DHCP server 106.

Thereafter, at step 206, the client machine 108 receives a first software module from at least one of the installation servers 102, 104. This is explained in detail in conjunction with FIG. 3 below. The first software module is compatible with a processor type of the client machine 108. As illustrated in FIG. 1, the client machine 110 includes a management card 112. Here, the client machine 110 receives a request from at least one of the installation server 102 and the installation server 104, for Vital Product Data (VPD). For example, the VPD may be stored on the management card 112 on the client machine 110. The VPD includes information regarding the client machine 110, such as model number and type number. The client machine 110 transmits the VPD to at least one of the installation servers 102, 104. In response to transmitting the VPD, the client machine 110 receives the first software module from at least one of the installation servers 102, 104.

The first software module is referred to as a "minimalistic operating system (OS)". The minimalistic OS provides minimal functionality, just sufficient for supporting the processor type of the client machine 108 and some standard set of hardware in the client machine 108. Typical size of the minimalistic OS ranges from 500 KB-10 MB. An example of a minimalistic OS is the Linux® kernel, together with some utilities, selected from among the various system or application utilities known to those in the art. As set out below, key functionalities of the minimalistic OS are determining the hardware elements of the client machine 108, using a suitable method, such as scanning the client machine and creating information which typically consists of a list of all elements, for example hardware elements, peripheral devices etc., and transmitting that information to at least one of the installation servers 102, 104.

At step 208, the first software module scans the client machine 108 to create a list of elements, including hardware elements, on that machine. For example, the first software module may query each port and expansion slot in the client machine 108. At step 210, the client machine 108 transmits the list of hardware elements to at least one of the installation servers 102, 104. Thereafter, at step 212, the client machine 108 receives a suitable Operating System Environment (OSE) from at least one of the installation servers 102, 104 based on the processor type and the list of hardware elements. A suitable OSE includes an operating system and device drivers for hardware elements in the list of hardware elements on the client machine 108. Beyond those requirements, an OSE may include further elements such as software applications based on considerations such as a user profile, a user history, and the list of hardware elements on the client machine 108. Finally, at step 214, the suitable operating system environment is installed on the client machine 108.

A number of alternate embodiments may be implemented, presenting variations to the embodiment of FIG. 2 discussed above. The exemplary embodiments set out below are by no means exhaustive, but illustrate possible directions in which the claimed invention can be set out.

In an alternate embodiment, specific to desktop virtualization environment, the client machine 108 receives a list of suitable OSEs from at least one of the installation servers 102, 104. Each OSE, in the list of suitable OSEs, may include an operating system, device drivers for hardware elements on the client machine 108, 110 and software applications based on considerations such as a user profile, a user history, or the list of hardware elements on the client machine 108, 110. The client machine 108, 110 presents the list of suitable OSEs to a user of the client machine 108, 110, and the user then selects an OSE from the list of suitable OSEs. Thereafter, the client machine 108, 110 transmits the user selection to at least one of the installation servers 102, 104. In response, the client machine receives the OSE selected by the user.

In a further alternate to the embodiment described above including a VPD, the client machine 110 can receive a VM image containing the suitable OSE from at least one of the installation server 102, 104 at step 212. The VM image is configured to run on the first software module. The VM image may be generated in a number of ways known in the art, such as by creating a VMware image, a XEN image and a KVM image, or others methods producing equivalent results.

In yet another alternate embodiment, specific to the desktop virtualization environment, the client machine 110 can receive a request to connect with the VM 116 deployed on the installation server 104. Thereafter, the client machine 110 establishes a connection with the VM 116, which hosts a suitable OSE. The connection may be established using a suitable remote desktop protocol, such as the Virtual Network Computing (VNC®), Remote Desktop Protocol (RDP®), Independent Computing Architecture (ICA®), or X Window System (X11®).

Figure 3:
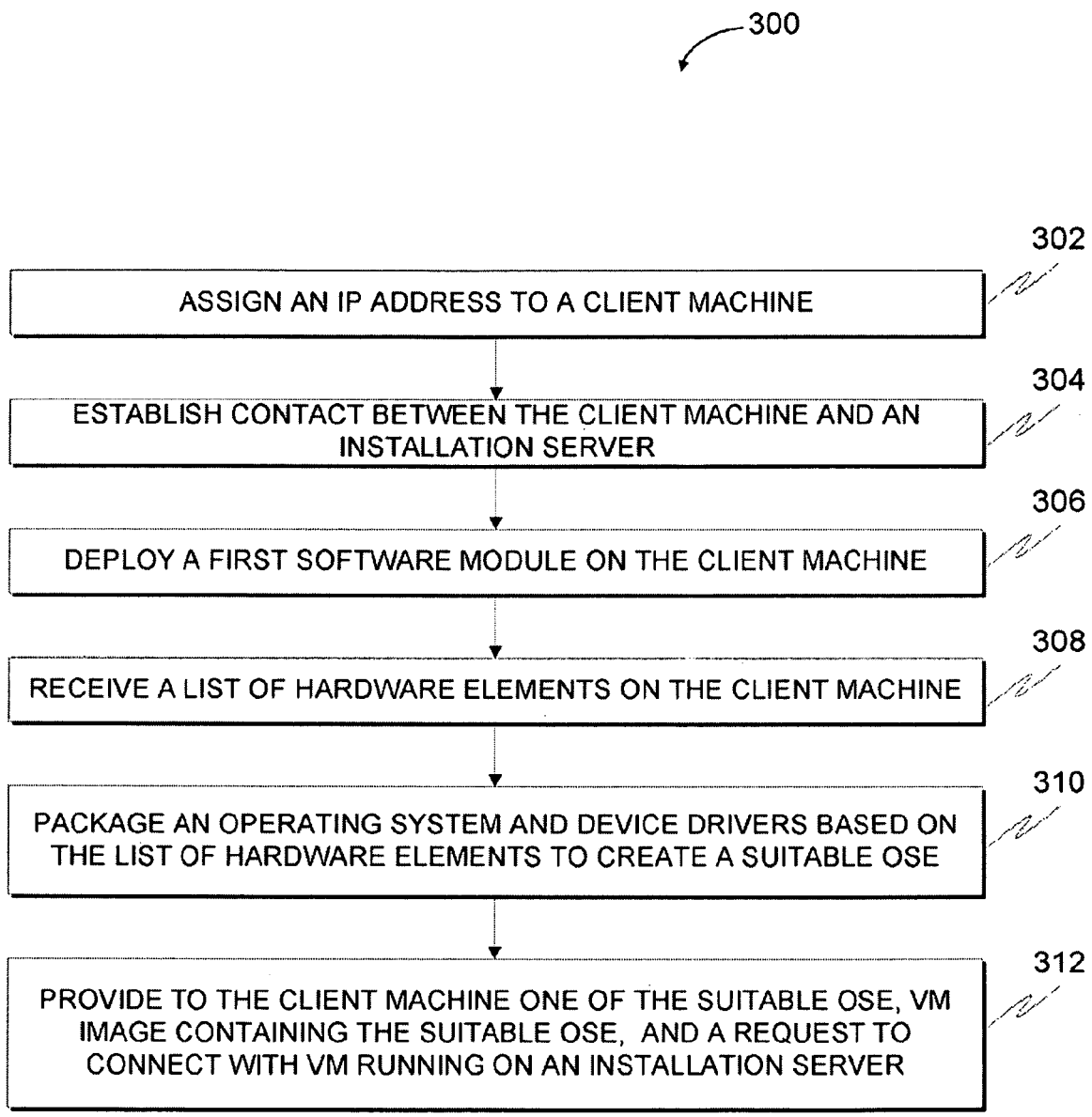
FIG. 3 is a flowchart of a method for servicing a client machine in a client-server computer architecture in an embodiment of the invention.

FIG. 3 illustrates a method 300 for servicing the client machine 108 in the client-server computer architecture 100 of FIG. 1. It will be recalled that the client machine 108 differs from the client machine 110 in lacking the management card 112. The client-server computer architecture 100 includes a network having the client machine 108 in communication with the DHCP server 106 and at least one of the installation servers 102, 104. The method 300 describes actions performed on one or more of the installation servers 102, 104 and the DHCP server 106, when they are in operation. At step 302, the DHCP server 106 assigns an IP address to the client machine 108, which, in one embodiment, may request that service, employing a DHCP request or other suitable means known in the art. In response to the request, the DHCP server 106 assigns an IP address to the client machine 108. The DHCP server 106 may also provide IP addresses of at least one of the installation server 102 and the installation server 104 to the client machine 108. Next, the client machine 108 establishes contact with at least one of the installation server 102, 104, at step 304.

Thereafter, at step 306, at least one of the installation server 102, 104 deploys a first software module on the client machine 108. The first software module scans the client machine 108 to generate a list of hardware elements on the client machine 108.

At step 308, at least one of the installation servers 102, 104 receives the list of hardware elements on the client machine 108 from the client machine 108. In response to receiving the list of hardware elements, at least one of the installation servers 102, 104 packages an operating system and device drivers, based on the list of hardware elements on the client machine 108, to create a suitable OSE, at step 310. In an embodiment, at least one of the installation servers 102, 104 selects a suitable OSE from OSEs created earlier. Thereafter, at step 312, at least one of the installation server 102 and the installation server 104 provides an appropriate package to the client machine 108 including the suitable OSE, or a VM image containing the suitable OSE, or a request to connect with a VM deployed on the installation server 104, or other means known in the art.

In one alternate embodiment, at least one of the installation servers 102, 104 may transmit a list of suitable OSEs to the client machine 108. Each OSE, in the list may include the elements necessary to operating in a chosen configuration, such as an operating system, device drivers for hardware elements, and software applications. Those in the art will possess sufficient knowledge to assemble such lists, based on considerations such as a user profile, a user history, and the list of hardware elements on the client machine 108. Then, at least one of the installation servers 102, 104 receives a user selection from the client machine 108. In response, at least one of the installation servers 102, 104 provides one of the suitable OSE, a VM image containing the suitable OSE, and a request to connect with a VM deployed on the installation server 104.

In an alternate embodiment, at least one of the installation server 102, 104 transmits a request for VPD to the client machine 108. The VPD includes information regarding the client machine 108, such as a model number and a type number. Next, at least one of the installation servers 102, 104 receives the VPD from the client machine 108, determines the processor type and deploys a first software module to the client machine 108. Subsequently, the first software module may be installed using a network install procedure or other suitable means. The first software module is compatible with the processor type of the client machine 108. For example, in case the client machine 108 has an Intel x86 processor, at least one of the installation server 102, 104 deploys an Intel x86 based first software module on the client machine 108. Similarly, in case the client machine 108 has an IBM POWER® processor, and at least one of the installation server 102, 104 deploys an IBM POWER® based first software module on the client machine 108.

In another embodiment, at least one of the installation servers 102, 104 and the client machine 108 dynamically generates the list of suitable OSEs based on the list of hardware elements on the client machine 108. For example, if the client machine 108 does not have a graphics adapter supporting 3D acceleration, then OSEs requiring 3D acceleration are not included in the list of suitable OSEs presented to the user. Similarly, if the client machine 108 has a joystick or a gamepad, then OSEs suitable for gaming may be included in the list of suitable OSEs presented to the user.

In another embodiment, at least one of the installation servers 102, 104 and the client machine 108 may generate the list of suitable OSEs by modifying a static list of OSEs, based on the list of hardware elements on the client machine 108. The static list is a master list of all available OSEs, maintained by at least one of the installation server 102, 104, as will be well known to those in the art. For example, the static list may include:

1. OSE: Redhat Linux
Specific hardware needed: NA.
Address of OSE: 192.168.1.20
2. OSE: Windows XP
Specific hardware needed: NA.
Address of OSE: 192.168.1.21
3. OSE: Gaming
Specific hardware needed: 3D acceleration, Joystick.
Address of OSE: 192.168.1.254
4. OSE: Storage
Specific hardware needed: Fiber Cable adapter.
Address of OSE: 192.168.1.253
5. OSE: DVD burning
Specific hardware needed: DVD burner.
Address of OSE: 192.168.1.252
  In case scanning by the first software module detects a DVD burner attached to the client machine 108, the list of suitable OSEs generated by modifying the static master list may include:
1. OSE: Redhat Linux
Address of OSE: 192.168.1.20
2. OSE: Windows XP
Address of OSE: 192.168.1.21
3. OSE: DVD burning
Address of OSE: 192.168.1.252

An alternate embodiment of the method set out in FIG. 3 can be referred to as a "learning-based" approach for determining a suitable OSE, for a given client machine. At least one of the installation server 102, 104 may generate a user profile for a given client machine, either by asking a user a set of questions, or by offering a set of choices to a user. A user profile may be assembled by looking to a user's history, which in turn may be collected by maintaining records of the user's actions on the machine. User history may include information regarding OSEs used on the given client machine, for example. When a user is identified to the system during boot-up, a list of suitable OSEs may be generated. Such a list may be generated dynamically from scratch or by modifying a static list of OSEs that includes all available OSEs. Users spending time browsing the Internet would be presented OSEs suitable for online activities, for example.

Figure 4:
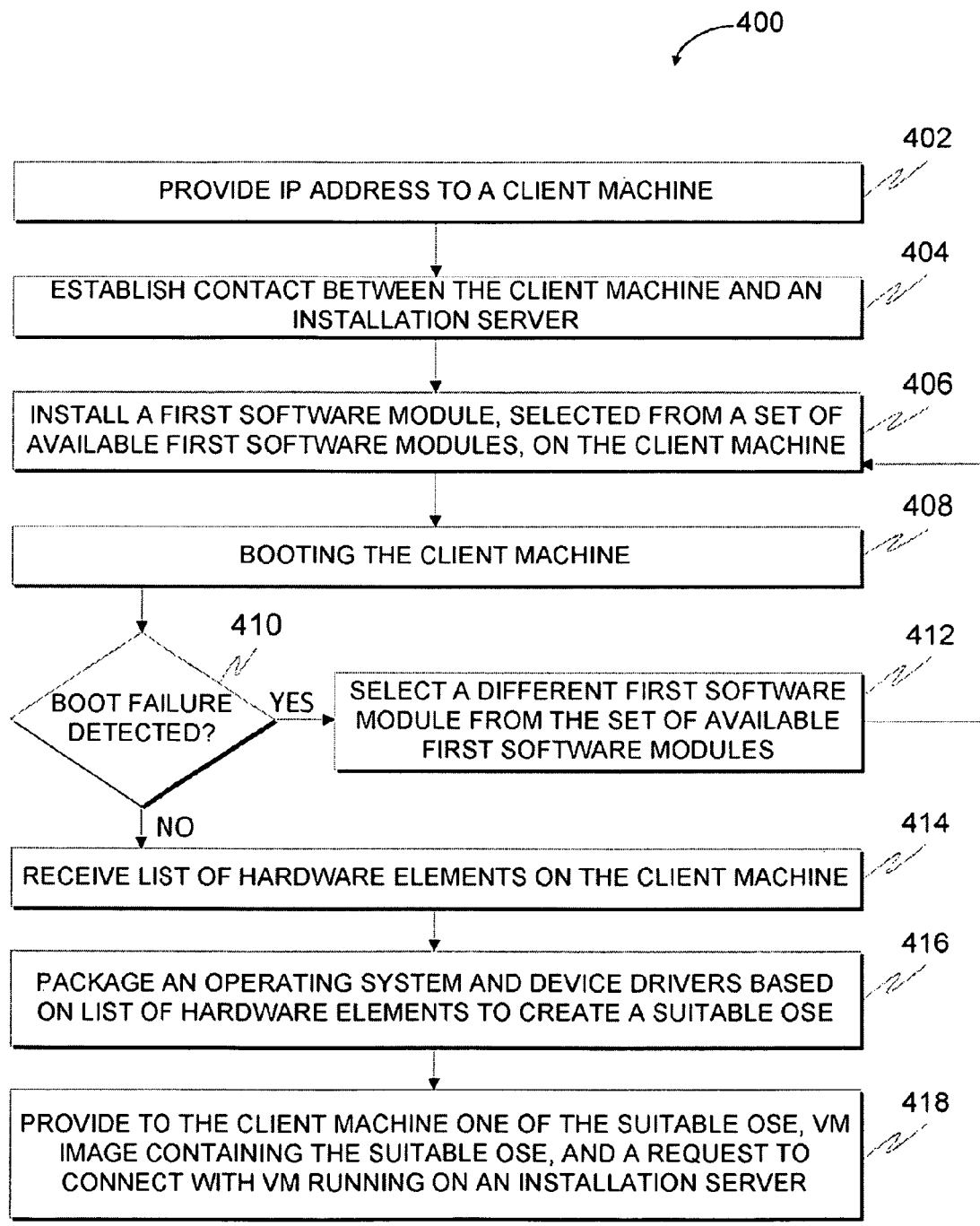
FIG. 4 is a flowchart of a method for servicing a client machine in a client-server computer architecture in an embodiment of the invention.

FIG. 4 depicts a method 400 for servicing the client machine 108 in the client-server computer architecture 100 of FIG. 1. The client-server computer architecture 100 includes a network having the client machine 108 in communication with the DHCP server 106 and at least one of the installation server 102, 104. The method 400 describes actions performed on one or more of the installation server 102, 104 and the DHCP server 106, when they are in operation. At step 402, the DHCP server 106 provides an IP address to the client machine 108, as explained in detail in conjunction with FIG. 2 above. Next, at step 404, at least one of the installation server 102, 104 establishes contact with the client machine 108.

At step 406, at least one of the installation server 102, 104 deploys a first software module to the client machine 108. The first software module is selected from a set of available first software modules on at least one of the installation server 102, 104. The first software module may be selected based on information in vendor-class-identifier field in a DHCP request by the client machine 108. For example, in case the vendor-class-identifier is "PXEClient", a first software module, based on Central Processing Unit (CPU) architecture type x86, is selected first as, in general, Intel® or AMD® based computers send "PXEClient" as a vendor-class-identifier in their DHCP requests. Similarly, if the BOOTP protocol is used, a first software module based on CPU architecture type IBM POWER® is selected first as in general; IBM POWER® based computers use BOOTP protocol to send their DHCP requests. The first software module is configured to scan the client machine 108 to generate a list of hardware elements on the client machine 108.

In response to deploying the first software module on the client machine 108, in one embodiment at least one of the installation servers 102, 104 boots the client machine 108, at step 408. The client machine 108 may be booted using a network boot procedure, for example, BOOTP. Thereafter, at step 410, at least one of the installation server 102, 104 determines whether a boot failure has occurred, by monitoring a serial console output on the client machine 108. A boot failure may be also be detected by pinging the client machine 108, as appreciated by those in the art. If a boot failure is detected, at least one of the installation server 102, 104 selects a different first software module from a set of available first software modules at step 412, and the process goes back to step 406.

Alternatively, at step 414 at least one of the installation server 102, 104 receives a list of hardware elements on the client machine 108, from the client machine 108. Thereafter, at step 416, at least one of the installation servers 102, 104 packages an operating system and device drivers, based on the list of hardware elements on the client machine 108, to create a suitable OSE at step 416. This has been explained in detail in conjunction with FIG. 3 above. Thereafter, at step 418, one of the suitable OSE, a VM image containing the suitable OSE, and a request to connect with a VM deployed on the installation server 104, is provided to the client machine 108. This has been explained in detail in conjunction with FIG. 3 above.

Figure 5:
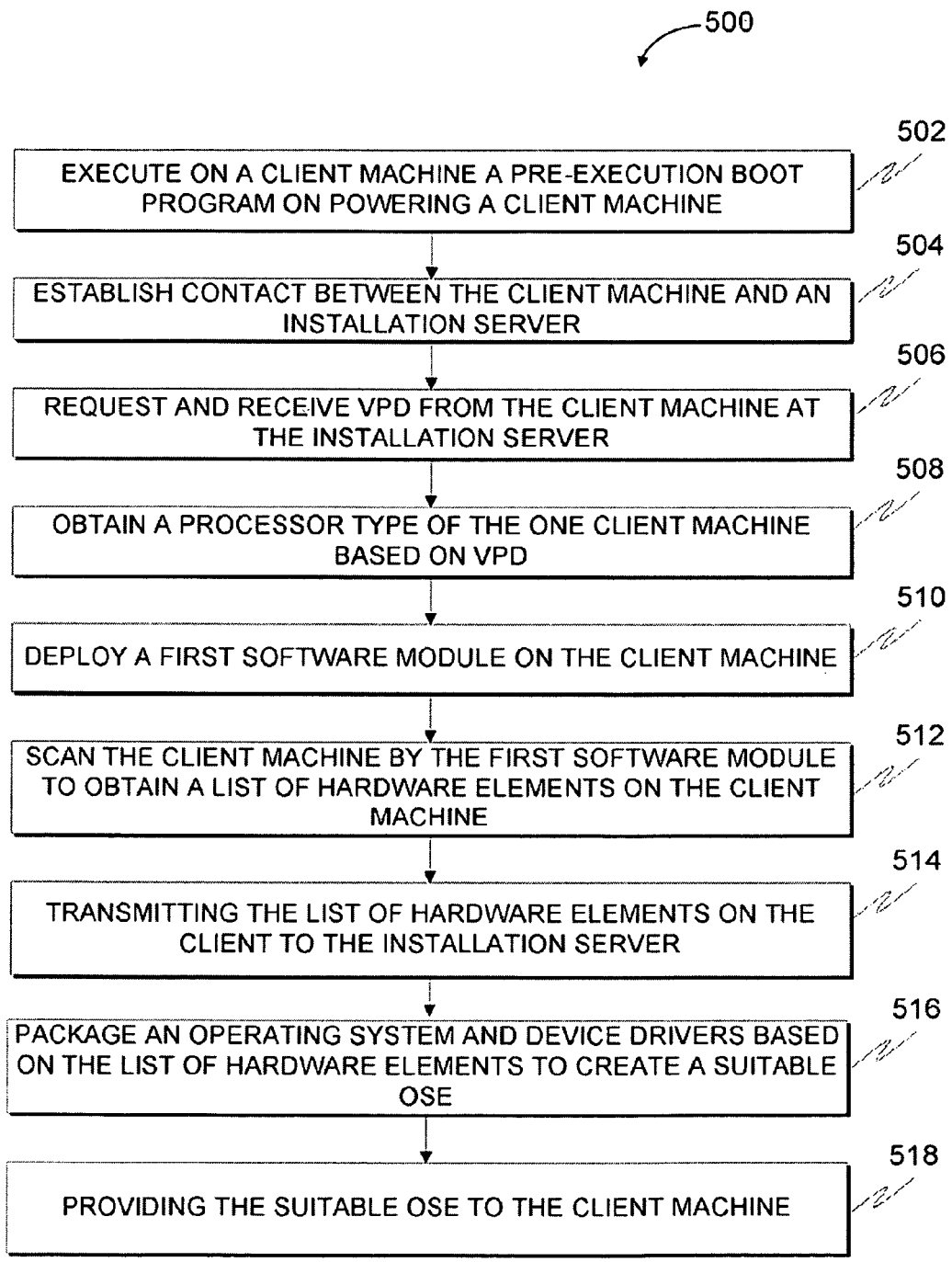
FIG. 5 is a flowchart of a method for provisioning a suitable operating system environment to a client machine in a client-server computer architecture in an embodiment of the invention.

Turning now to FIG. 5, a method 500 that provisioning a suitable OSE to the client machine 110 in the client-server computer architecture 100 of FIG. 1. In this method, the steps performed by the client machine, such as the client machine 110, are the focus of discussion, and the network architecture of FIG. 1 is used. The process begins at 502, where a pre-execution boot program is executed on the client machine 110, on powering the client machine 110, an action described above in connection with FIG. 2. Then, at step 504, the client machine 110 establishes contact with at least one of the installation server 102, 104. At least one of the installation server 102, 104 requests and receives VPD from the client machine at step 506. VPD is described in detail, above.

Thereafter, at step 508, at least one of the installation server 102, 104 obtains a processor type of the client machine 110, based on the VPD. In one embodiment, at least one of the installation server 102, 104 uses a database of processor types along with associated model numbers and type numbers of client machines, to determine the processor type of the client machine 110, the selection, setup, and maintenance of such database being well within the skill of those in the art.

At step 510, at least one of the installation server 102, 104 deploys a first software module on the client machine 110. The first software module is compatible with the processor type of the client machine 110. The first software module scans the client machine 110 to generate a list of hardware elements on the client machine 110, at step 512. Then, at step 514, the client machine 110 transmits the list of hardware elements to at least one of the installation server 102, 104. Thereafter, at step 516, at least one of the installation server 102, 104 packages an operating system and device drivers, based on the processor type and the list of hardware elements on the client machine 110, to create a suitable OSE. In an embodiment, at least one of the installation server 102, 104 further packages software applications together with the suitable OSE, based on a selected user indication. Selected user indications may include user history, the list of hardware elements on the client machine, or other indicia demonstrating software applications that might be necessary or useful to a user, as are readily known by those in the art.

In an alternate embodiment, at least one of the installation server 102, 104 transmits a list of suitable OSEs to the client machine 110. The list of suitable OSEs is generated based on the processor type and the list of hardware elements on the client machine 110. Then, the client machine 110 presents the list of suitable OSEs to a user. The user selects an OSE from the list of suitable OSEs. The client machine 110 transmits the user selection to at least one of the installation server 102 and the installation server 104. At least one of the installation server 102 and the installation server 104 packages an operating system and device drivers based the user selection.

Finally, at step 518, at least one of the installation server 102, 104 provides the suitable OSE by performing one of establishing a connection between the client machine 110 and the VM 116 deployed on the installation server 104, and deploying one of the suitable OSE and a VM image containing the suitable OSE on the client machine 110. The VM 116 hosts the suitable OSE. The VM image is configured to run on the first software module. This has been explained in detail in conjunction with FIG. 2, FIG. 3 and FIG. 4.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a client-server architecture including at least one client machine in communication with a plurality of servers over a network, a method for provisioning a suitable operating system environment to a client machine in the network based on hardware elements of the client machine, the method comprising:
   receiving, from at least one installation server, a first software module at the client machine, wherein the first software module is compatible with a processor type of the client machine;
   in response to the client machine receiving the first software module, a processor of the client machine executing the first software module, which performs the functions of:
      scanning the client machine to obtain a list of hardware elements on the client machine; and
      transmitting the list of hardware elements on the client machine to the at least one installation server;
   the client machine receiving, from the installation server, a suitable Operating System Environment (OSE) for the client machine, wherein the suitable OSE includes an operating system and device drivers for each hardware element in the list of hardware elements on the client machine, wherein the operating system and device drivers for each hardware element are packaged into the OSE at the at least one installation server; and
   deploying the suitable OSE on the client machine.

2. The method of claim 1, further comprising:
   on powering up of the client machine, executing a pre-execution boot program, wherein the pre-execution boot program is configured to identify a Dynamic Host Control Protocol (DHCP) server on the network, in the plurality of servers, to obtain an Internet Protocol (IP) address for the client machine; and
   establishing contact with the at least one installation server in the plurality of servers on the network.

3. The method of claim 1, wherein the first software module is a minimalistic operating system.

4. The method of claim 1, further comprising:
   receiving a request from the at least one installation server for Vital Product Data (VPD), wherein the VPD includes information regarding the client machine; and
   transmitting the VPD to the at least one installation server.

5. The method of claim 4, wherein the VPD is stored on a management card on the client machine.

6. The method of claim 1, wherein the suitable OSE is contained within a Virtual Machine (VM) image received at the client machine from the at least one installation server, and wherein the VM image is configured to run on the first software module.

7. The method of claim 1, wherein receiving the suitable OSE includes:
   receiving a request to connect with a VM deployed on the installation server, wherein the VM deployed on the installation server is hosting the suitable OSE; and
   establishing a connection with the VM deployed on the installation server.

8. The method of claim 7, wherein the connection is established using a remote desktop protocol.

9. The method of claim 1, wherein receiving the suitable OSE further includes:
   receiving a list of suitable OSEs from the at least one installation server, wherein the list of suitable OSEs is dynamically generated by the at least one installation server responsive to the at least one installation server receiving the list of hardware elements on the client machine;
   presenting the list of suitable OSEs on the client machine;
   receiving a selection of the suitable OSE from the list of suitable OSEs; and transmitting a request for the selected suitable OSE to the at least one installation server.

10. A method for servicing a client machine in a client-server computer architecture based on hardware elements of the client machine, wherein the client-server computer architecture includes a network having at least one client machine in communication with a plurality of servers, the method comprising:
   an installation server deploying a first software module to the client machine, wherein the first software module is configured to scan the client machine to generate a list of hardware elements on the client machine;
   the installation server receiving, from the client machine, the list of hardware elements, generated by the first software module;
   packaging an operating system and device drivers based on the list of hardware elements on the client machine into a suitable Operating System Environment (OSE) for the client machine, wherein the device drivers include drivers for each hardware element in the list of hardware elements on the client machine; and
   providing, to the client machine, one of the suitable OSE, a Virtual Machine (VM) image containing the suitable OSE, and a request to connect with a VM deployed on the installation server to the client machine, wherein the VM deployed on the installation server hosts the suitable OSE.

11. The method of claim 10, wherein deploying the first software module includes:
   transmitting a request to the client machine for Vital Product Data (VPD), wherein the VPD includes information regarding the client machine;
   receiving the VPD from the client machine;
   obtaining the processor type based on the VPD; and
   deploying the first software module on the client machine, wherein the first software module is compatible with the processor type of the client machine.

12. The method of claim 10, wherein deploying the first software module includes:
   deploying the first software module on the client machine, wherein the first software module is selected from a set of available software modules;
   booting the client machine using the first software module; and
   monitoring the client machine for a boot failure, wherein the boot failure of the client machine is detected by one of monitoring a serial console output of the client machine or by pinging the client machine;
   in response to detecting a boot failure of the client machine:
      deploying to the client machine a next software module from the set of available software modules; and
      booting the client machine using the next software module.

13. The method of claim 10, wherein the providing includes deploying the suitable OSE on the client machine.

14. The method of claim 10, wherein packaging the operating system and device drivers further includes:
   transmitting a list of suitable OSEs to the client machine;
   receiving, from the client machine, a selection of the suitable OSE from the list of suitable OSEs; and
   deploying the VM image containing the selected suitable OSE on the client machine.

15. The method of claim 14, wherein the list of suitable OSEs is dynamically generated based on at least one of a history of a user of the client machine, a profile of a user of the client machine, and the list of hardware elements on the client machine.

16. The method of claim 14, wherein the list of suitable OSEs is generated by modifying a static list of OSEs based on at least one of a history of a user of the client machine, a profile of a user of the client machine, and the list of hardware elements on the client machine, wherein the static list is a master list of all available OSEs.

17. A method for provisioning a suitable Operating System Environment (OSE) to a client machine in a client-server computer architecture based on hardware elements of the client machine, wherein the client-server computer architecture includes a network having at least one client machine in communication with a plurality of servers, the method comprising:
   on powering on of the client machine in the network, executing a pre-execution boot program that is configured to identify a Dynamic Host Control Protocol (DHCP) server, from the plurality of servers, to obtain an Internet Protocol (IP) address for the client machine;
   the client machine establishing contact with at least one installation server in the network;
   the client machine sending Vital Product Data (VPD) to the at least one installation server, wherein the VPD includes information regarding the client machine, wherein the VPD is stored in a management card on the client machine;
   obtaining a processor type of the client machine based on the VPD;
   receiving a first software module at the client machine, wherein the first software module is compatible with the processor type of the client machine, and wherein the first software module is deployed to the client machine by the at least one installation server;
   in response to the client machine receiving the first software module, a processor of the client machine executing the first software module, which performs the functions of:
      scanning the client to generate a list of hardware elements on the client machine; and
      transmitting the list of hardware elements on the client machine to the at least one installation server;
   the client machine receiving, from the at least one installation server, the suitable OSE for the client machine, wherein the suitable OSE includes an operating system and device drivers for each hardware element in the list of hardware elements on the client machine, and wherein the operating system and device drivers for each hardware element are packaged into the OSE at the at least one installation server;
   wherein the at least one installation server generates the suitable OSE by performing one of:
      establishing a connection between the client machine and a Virtual Machine (VM) deployed on the at least one installation server, wherein the VM is hosting the suitable OSE; and
      deploying one of the suitable OSE and a VM image containing the suitable OSE on the client machine, wherein the VM image is configured to run on the first software module.

18. The method of claim 17, wherein the step of obtaining a processor type includes using a database of processor types along with associated model numbers and type numbers of client machines to determine the processor type of the client machine based on the VPD.

19. The method of claim 17, wherein the step of packaging an operating system and device drivers further includes packing software applications, based on at least one of a user requirement, a history of a user of the client machine, and the list of hardware elements on the client machine, in the suitable OSE.

20. The method of claim 17, wherein the step of packaging an operating system and device drivers further includes:
- transmitting a list of suitable OSEs to the client machine, wherein the list of suitable OSEs is generated at the at least one installation server based on the processor type and the list of hardware elements on the client machine;
- presenting the list of suitable OSEs on the client machine;
- receiving a selectionof an OSE from the list of suitable OSEs; and
- transmitting a request for the selected OSE to the at least one installation server, wherein the selected OSE corresponds to the suitable OSE.

* * * * *